(12) United States Patent
Williams et al.

(10) Patent No.: US 8,161,471 B2
(45) Date of Patent: Apr. 17, 2012

(54) UTILITY FOR OPTIMIZING REQUIRED MEMORY FOR DISTRIBUTION IN EMBEDDED SYSTEMS

(75) Inventors: Clark Williams, Madison, AL (US); Brendan Conoboy, Albuquerque, NM (US)

(73) Assignee: Red Hat, Inc., Raleigh, NC (US)

( * ) Notice: Subject to any disclaimer, the term of this patent is extended or adjusted under 35 U.S.C. 154(b) by 1187 days.

(21) Appl. No.: 11/607,634

(22) Filed: Nov. 30, 2006

(65) Prior Publication Data
US 2008/0134169 A1 Jun. 5, 2008

(51) Int. Cl.
*G06F 9/445* (2006.01)
(52) U.S. Cl. .................. 717/167; 717/166; 717/172
(58) Field of Classification Search .................. None
See application file for complete search history.

(56) References Cited

U.S. PATENT DOCUMENTS

| | | | | |
|---|---|---|---|---|
| 6,438,573 B1 * | 8/2002 | Nilsen | | 718/100 |
| 7,409,685 B2 * | 8/2008 | Chen et al. | | 717/170 |
| 7,478,385 B2 * | 1/2009 | Sierer et al. | | 717/174 |
| 2004/0199897 A1 * | 10/2004 | Ghercioiu et al. | | 717/101 |
| 2005/0132351 A1 * | 6/2005 | Randall et al. | | 717/168 |

* cited by examiner

*Primary Examiner* — Chuck Kendall
(74) *Attorney, Agent, or Firm* — Lowenstein Sandler PC

(57) ABSTRACT

A method and apparatus for optimizing required memory of an embedded system. The method may include identifying one or more applications to be installed on a target embedded system, and estimating the amount of memory required for the operation of the embedded system. The method may further include comparing the estimated amount of the required memory with the amount of memory available on the embedded system.

23 Claims, 5 Drawing Sheets

UTILITY FOR OPTIMIZING REQUIRED MEMORY FOR DISTRIBUTION IN EMBEDDED SYSTEMS

TECHNICAL FIELD

Embodiments of the present invention relate to embedded systems, and more specifically, to optimizing required memory for distribution in embedded systems.

BACKGROUND

An embedded system is a special-purpose system in which the computer is encapsulated by the device it controls. Devices that utilize embedded systems may include, for example, information appliances, smart phones, set-top boxes, personal digital assistants (PDAs), etc.

Embedded systems often utilize the Linux operating system because it is available as open source software. Linux was initially designed for use with personal computer systems that have a large amount of storage space available. Embedded systems, in contrast, have a limited amount of storage space. In addition, an embedded system, unlike a general-purpose computer such as a personal computer, usually performs a single predefined function having very specific requirements. Hence, in view of space constraints and cost savings, an embedded system should provide only the storage space that is required for the specified function.

When developing an embedded system, a designer typically uses a development environment on a host PC. In particular, the designer selects a set of software packages for the embedded system and copies these software packages to the host PC. The software packages may be in the Red Hat® Package Manager (RPM) format, which is a native packaging format of the Linux operating system. Each software package has its own function and operation. The designer must have a significant depth of knowledge of the software and hardware to decide which software packages need to be selected for the embedded system.

Once the selection of the software packages is completed, the designer integrates the selected software packages into a root file system, which is then compressed to an image file and loaded to a target device. The loaded image file is used to test the operation of the root file system. If the amount of memory available on the embedded system is insufficient for the operation of the root file system, the designer has to return to the development process and make a different selection of software packages.

As can be seen from the above description, the prior art method for developing embedded systems is complicated and time consuming.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
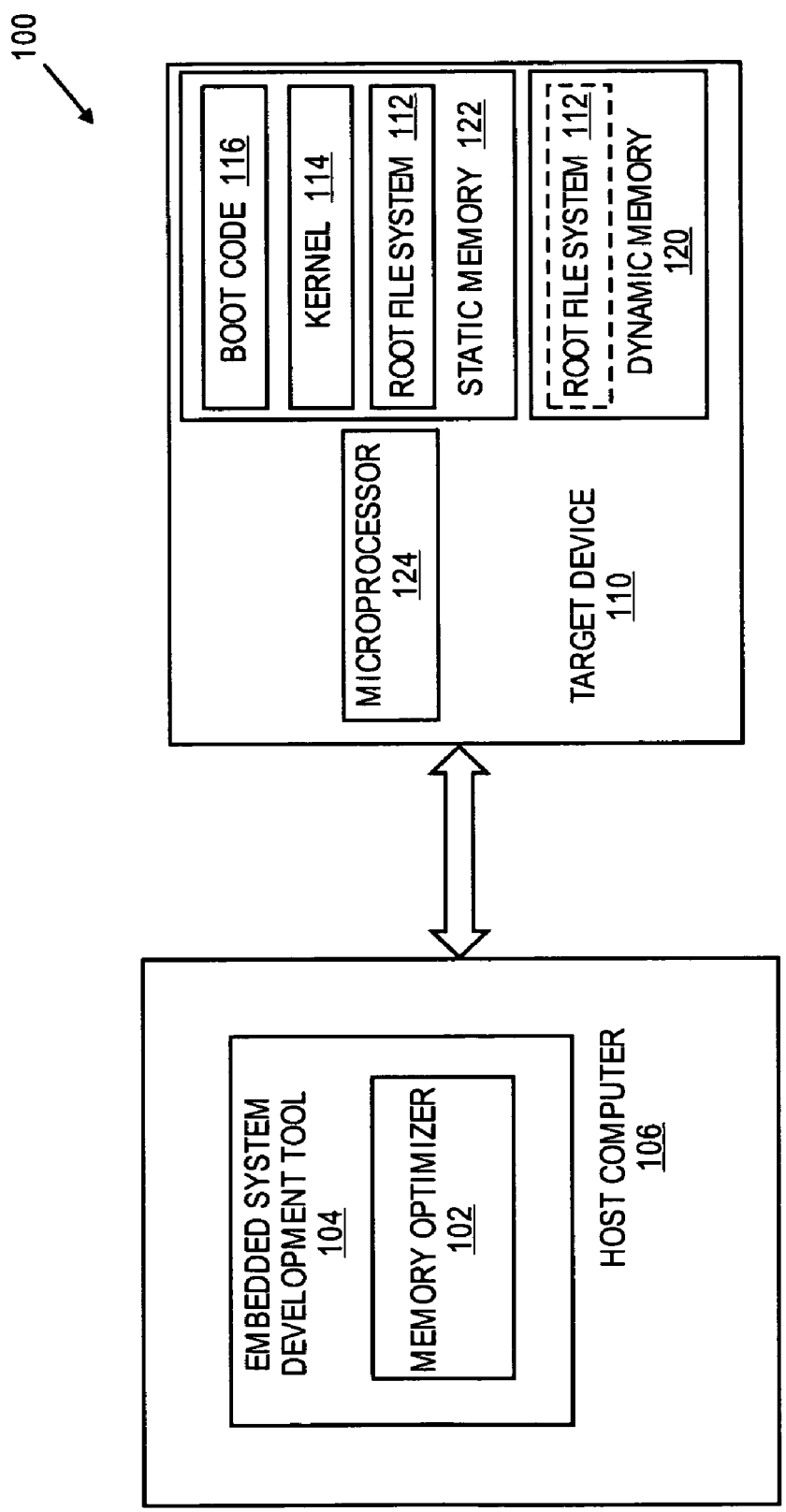
FIG. 1 is a block diagram of an exemplary system in which embodiments of the invention may be implemented.

Described herein is a method and apparatus for optimizing required memory of an embedded system. In one embodiment, an embedded system development tool receives user input identifying one or more applications to be installed on a target embedded system. In response, the embedded system development tool estimates the amount of memory required for the operation of the embedded system, and compares the estimated amount of required memory with the amount of memory available on the embedded system. If the amount of required memory exceeds the amount of available memory, processing logic modifies the set of applications to be installed on the embedded system, and recalculates the amount of required memory.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a block diagram of an exemplary system 100 in which embodiments of the invention may be implemented. The system 100 includes a host computer 106 that provides the design environment for developing an embedded system for a target device 110. The host computer 106 may be a personal computer (PC), a server or any other machine. The host computer 106 may be coupled to the target device 110 directly (e.g., via a cable) or via a network (e.g., a public or private network).

The target device 110 may be an information appliance, a smart phone, a set-top box, a personal digital assistant (PDA), a network appliance, etc. The target device 110 may include one or more microprocessors 124, a static (non-volatile) memory 122, and a dynamic (volatile) memory 120. The microprocessor 124 controls operation of the embedded system. The static memory 122 (e.g., flash memory or ROM) is utilized to record a boot code 116, a kernel 114 and a root file system image 112. For some exemplary target devices (e.g., PDA), the root file system 112 may be stored at least partially in the dynamic memory 120. The dynamic memory 120 (e.g., DRAM) is utilized to temporarily store program code and operation information required for the operation of the embedded system. The boot code 116 is utilized to control the loading of the kernel 114.

The host computer 106 may store, or have access to, various software packages available for installation on the target device. The software packages 102 may pertain to a specific operating system (e.g., Linux, Windows, Solaris, OS-X, IRIX, HP-UX, etc.) and can be in a native package format of this operating system, or they can be in some arbitrary format. Examples of native package formats include Red Hat® Package Manager (RPM) format packages, Itsy Package Management System (IPKG) format, Debian Package (DEB) format, Windows Installer (MSI) package format, Solaris datastream package (PKG) format, etc. Software packages may include source code, executable files, support files and shared libraries that may be used by the operating system and various applications. The number, type and contents of software packages differ between software package formats. For example, the RPM or IPKG packages used on Linux may include packages with manual pages to allow user interaction with the operation of the system, packages with locale information for different languages to be used during the operation of the system, packages for different device drivers, etc.

In one embodiment, the host computer 106 contains an embedded system development tool 104 that designs the embedded system for the target device 110. In particular, the tool 104 selects a set of packages that corresponds to the class of the embedded system (e.g., information appliance, smart phone, set-top box, PDA, network appliance, etc.). The tool 104 may provide a UI interface facilitating designer input of information pertaining to the embedded system being developed. This information may include, for example, the class of the embedded system, the applications to be installed, the language to be used by a user of the embedded system, etc. To select software packages corresponding to the specified class, the tool 104 may consult a knowledge database that provides information on the packages that are required for specific classes of embedded systems.

Next, tool 104 may receive the system designer's input identifying one or more applications desired by the system designer to run on the target device 110, and integrate software packages of these applications into the root file system. In one embodiment, the tool 104 also defines the structure of the root file system and places the packages of the applications at specific locations within the root file system. The tool 104 may automatically determine the location of these packages (e.g., based on a template file system having similar applications) or it may ask the system designer to specify the location.

Once the root file system is created, the tool 104 may identify package components that are not strictly required for the operation of the embedded system, and remove these package components from the root file system. Such package components may include, for example, manual pages, unneeded locales, unneeded device drivers, etc. In addition, the tool 104 may perform a shared library dependency analysis on all executable files in the root file system and remove all shared libraries that are not referenced. In one embodiment, prior to removing a package component, the tool 104 consults the knowledge database that contains information on package components that must be present in the root file system. This information might have been collected based on prior operation of other embedded systems. The knowledge database may be updated each time an embedded system operates abnormally due to the absence of a specific package from the root file system. The knowledge database may be part of the tool 104 or be accessible to the tool 104 via a network (e.g., public network or private network).

In one embodiment, the tool 104 includes a memory optimizer 102 that calculates the amount of memory required for the operation of the embedded system based on the created root file system, and compares the amount of required memory with the amount of memory available on the embedded system. The amount of available memory is comprised of the amount of static memory 122 and the amount of dynamic memory 120. As to the amount of required memory, the memory optimizer 102 may calculate this amount based on the total storage space required by the operating system, the root file system and the boot code, and the total dynamic memory space required for the operation of the kernel and the specified applications.

If the memory optimizer 102 determines that the amount of required memory exceeds the amount of available memory, the memory optimizer 102 notifies the system designer about this. In one embodiment, the memory optimizer 102 asks the system designer to modify the set of applications to be run on the embedded system. Alternatively, the memory optimizer 102 automatically determines which application package needs to be removed from the root file system to conform to the amount of memory available on the embedded system. Once the set of applications is modified, the tool 104 rebuilds the root file system. The memory optimizer 102 then recalculates the amount of required memory based on the new root file system. If the recalculated amount of required memory still exceeds the amount of available memory, the above process may be repeated.

If the amount of required memory does not exceed the amount of available memory, the tool 104 may compress the resulting root file system to an image and load the image of the root file system to the target device 110. This image of the root file system (root file system 112) may be stored in static memory 122 of the target device 110, together with kernel 114 (e.g., Linux) and boot code 116 that controls the loading of the kernel 114. Alternatively, at least a portion of the root file system 112 may be stored in the dynamic memory 120. In some embodiments, the root file system 112 may be first loaded onto a simulated target device on the host computer 106 or some other machine for testing.

Accordingly, the tool 104 automates the process of developing an embedded system, making it efficient and easy to perform. As compared to prior art, the designer utilizing the tool 104 no longer needs to have significant depth of specific domain knowledge of the software and hardware, and can design the embedded system in a relatively short period of time.

Figure 2:
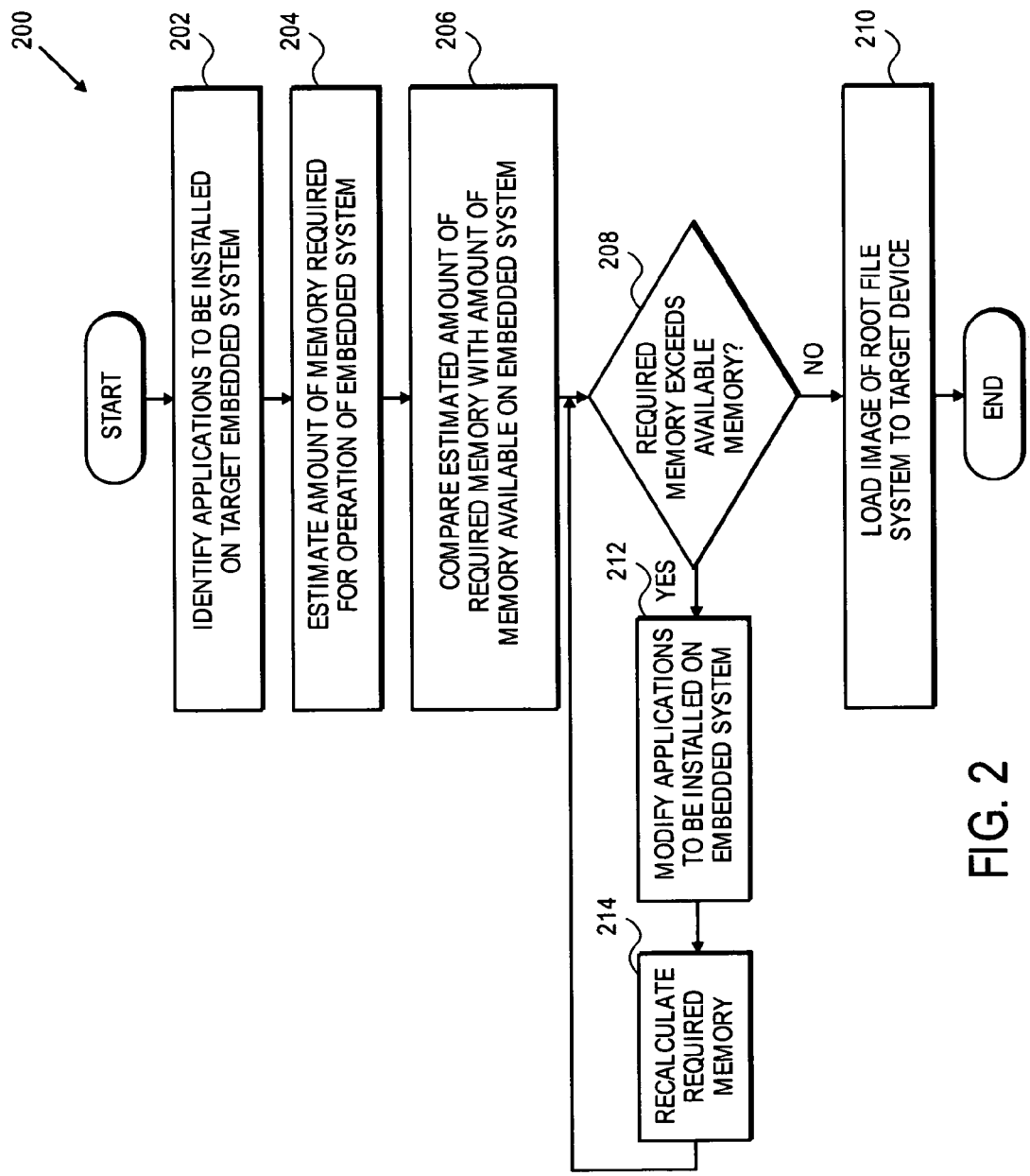
FIG. 2 is a flow diagram of one embodiment of a method for optimizing required memory of an embedded system.

FIG. 2 is a flow diagram of one embodiment of a method 200 for optimizing required memory of an embedded system. The method may be performed by processing logic that may comprise hardware (e.g., circuitry, dedicated logic, programmable logic, microcode, etc.), software (such as instructions run on a processing device), or a combination thereof. In one embodiment, method 200 is performed by an embedded system development tool 104 of FIG. 1.

Referring to FIG. 2, method 200 begins with processing logic identifying one or more applications to be run on the embedded system (block 202). In response, processing logic determines which software packages should be installed on the embedded system to allow normal operation of the applications, and integrates this packages into a root file system. The packages may be in a native packaging format of the operating system used with the embedded system. For example, the packages used with Linux may be in the RPM or IPKG format, the packages used with Solaris may be in the Solaris datastream package format, etc. Alternatively, packages may be in an arbitrary format not related to the operating system. For example, the Solaris datastream package may be used with Linux files, etc. In addition, packages can be converted from one format to another during the development of the embedded system (e.g., RPM packages may be converted into the IPKG format and vice versa). The packages may include source code, executable files, support files, shared libraries, etc. In addition, packages may include programs to execute (a program may be executed when a packages is installed or uninstalled). One embodiment of a method for building the root file system will be discussed in more detail below in conjunction with FIG. 4.

At block 204, processing logic estimates the amount of memory required for the operation of the embedded system based on the resulting root file system. The required memory includes storage space (static memory) required by the embedded system and dynamic memory space required for the operation of the embedded system. One embodiment of a method for estimating required memory will be discussed in more detail below in conjunction with FIG. 3.

At block 206, processing logic compares the amount of required memory with the amount of memory available on the embedded system. The amount of available memory is comprised of the amount of static memory and the amount of dynamic memory available on the embedded system. Each of available static and dynamic memory is compared separately with required static and dynamic memory respectively.

If processing logic determines that the amount of required memory exceeds the amount of available memory (block 208), processing logic modifies the applications to be installed on the embedded system (block 212). In one embodiment, processing logic modifies the applications based on user input specifying a new set of applications. Alternatively, processing logic automatically determines which application package needs to be removed from the root file system to conform to the amount of memory available on the embedded system. After the set of applications is modified, processing logic rebuilds the root file system, recalculates the amount of required memory based on the new root file system (block 214), and returns to block 208 to determine whether the recalculated amount of required memory still exceeds the amount of available memory.

If the amount of required memory does not exceed the amount of available memory, processing logic loads an image of the resulting root file system to the target device 110.

Figure 3:
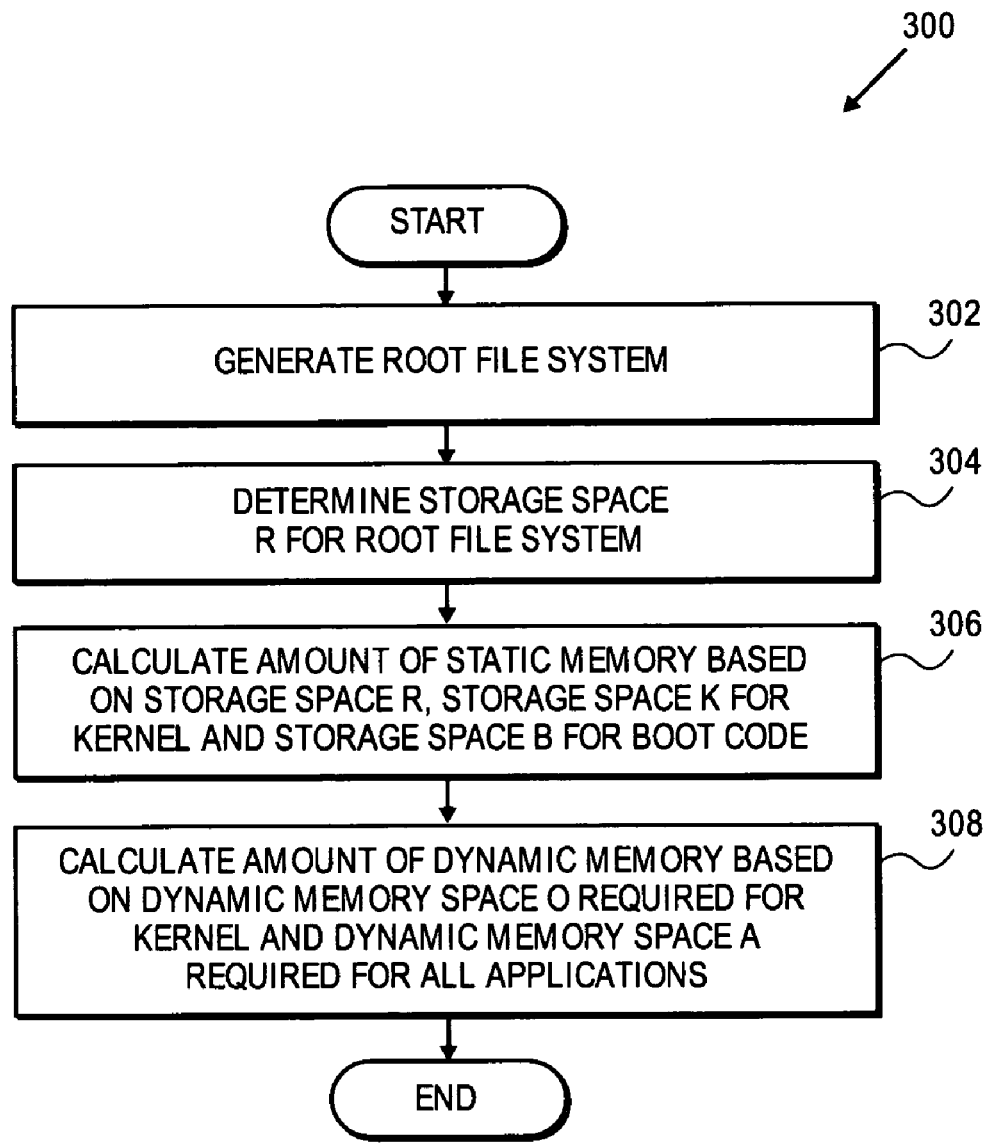
FIG. 3 is a flow diagram of one embodiment of a method for calculating the amount of memory required for the operation of an embedded system.

FIG. 3 is a flow diagram of one embodiment of a method 300 for calculating the amount of memory required for the operation of an embedded system. The method may be performed by processing logic that may comprise hardware (e.g., circuitry, dedicated logic, programmable logic, microcode, etc.), software (such as instructions run on a processing device), or a combination thereof. In one embodiment, method 300 is performed by an embedded system development tool 104 of FIG. 1.

Referring to FIG. 3, method 300 begins with processing logic building a root file system for the embedded system (block 302). At block 304, processing logic determines the amount of storage space R of the root file system.

At block 306, processing logic calculates the amount of required static memory based on storage space R and storage space K of the kernel. In one embodiment, processing logic also considers storage space B of boot code used to load the operating system. Processing logic may calculate the amount of required static memory by adding R, K and B, and multiplying the result by a predefined coefficient (e.g., 1.3).

At block 308, processing logic calculates the amount of required dynamic memory based on dynamic memory space O required for the operation of the kernel, and dynamic memory A1 through An required for the operations of the applications 1 through n. The above memory space amounts may be known in advance or be determined experimentally by running corresponding software and tracing its dynamic memory allocation. Processing logic may calculate the amount of required dynamic memory by adding O and A1 through An, and multiplying the result by a predefined coefficient (e.g., 1.1). If none of the applications 1 through n can run at the same time, the amount of required dynamic memory is calculated by adding O and the maximum Amax between the amounts A1 through An, and multiplying the result by a predefined coefficient (e.g., 1.1).

Figure 4:
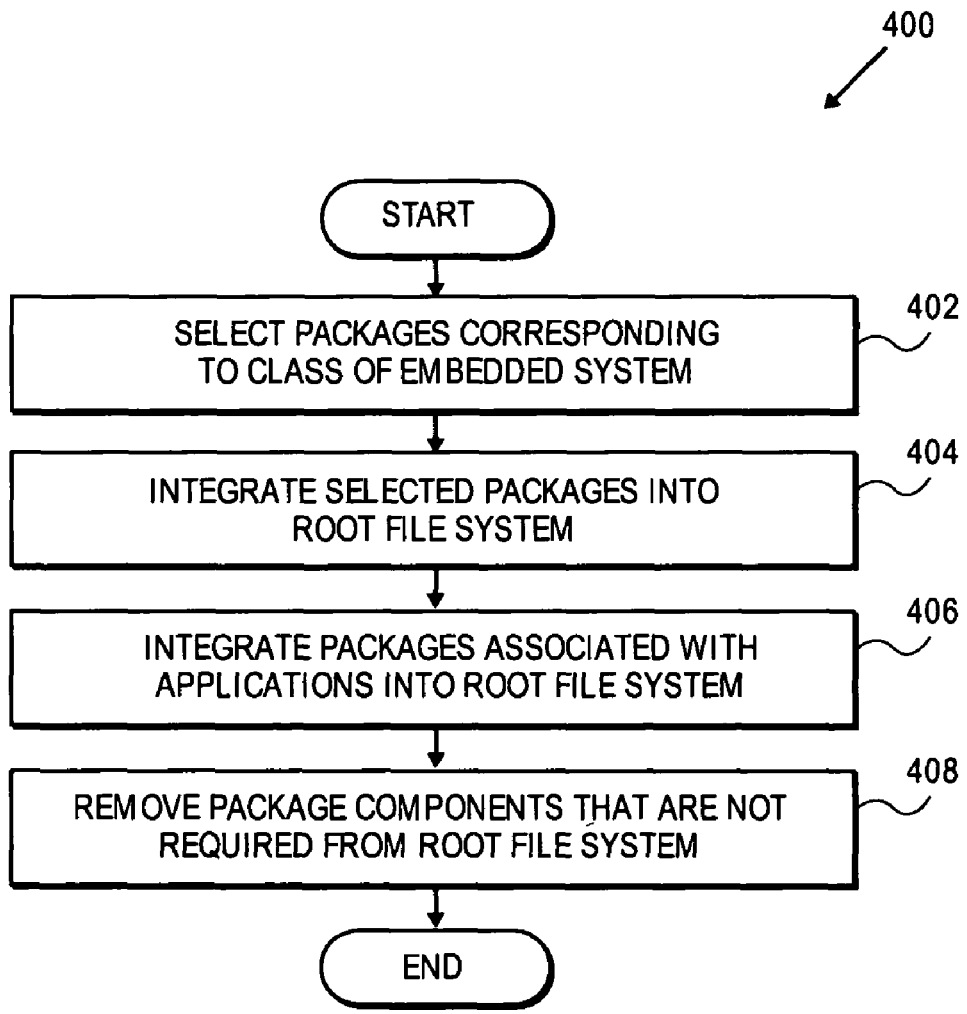
FIG. 4 is a flow diagram of one embodiment of a method for building a root file system of an embedded system.

In one embodiment, an Execute In Place (XIP) file system is used to allow some or all sections of programs to be stored only to the static memory. The XIP file system may allow code to run from the same location at which it is permanently stored, without copying them to the dynamic memory, thus saving the amount of required dynamic memory. Programs may use the dynamic memory only for their stack, BSS and data segments. FIG. 4 is a flow diagram of one embodiment of a method 400 for building a root file system of an embedded system. The method may be performed by processing logic that may comprise hardware (e.g., circuitry, dedicated logic, programmable logic, microcode, etc.), software (such as instructions run on a processing device), or a combination thereof. In one embodiment, method 400 is performed by an embedded system development tool 104 of FIG. 1.

Referring to FIG. 4, method 400 begins with processing logic selecting a set of packages corresponding to the class of the embedded system from various packages available for installation (block 402). In one embodiment, processing logic consults a knowledge database to determine which packages need to be present for the specified class of the embedded system. The class may include, for example, a set-top box, a smart phone, a PDA, a network appliance, etc. Alternatively, or in addition, classes may be defined based on considerations of technical constraints such as available storage space on the target device, available peripheral devices on the target device, the CPU architecture of the target device (e.g., Advanced RISC Machine (ARM), i386, etc.), etc.

At block 404, processing logic integrates the selected packages into a root file system. In one embodiment, processing logic defines the structure of the root file system based on the selected packages, and a template file system selected from a collection of templates based on the estimated size of the root file system, the intended number of file systems on the embedded system, and other parameters.

Next, processing logic receives user input identifying one or more applications to be run on the embedded system. In response, processing logic determines the location of the applications' packages in the root file system and integrates the application packages into the root file system (block 406). In one embodiment, processing logic asks the user to specify the location for the application packages within the root file system. Alternatively, processing logic determines the location automatically (e.g., based on a template file system containing the same or similar application packages). Processing logic may or may not notify the user about the determined location and ask for confirmation.

At block 408, processing logic removes package components that are not strictly required for the operation of the embedded system from the root file system. Such package components may include, for example, manual pages, unneeded locales, unneeded device drivers, etc. In addition, processing logic may perform a shared library dependency analysis on all executable files in the root file system and remove all shared libraries that are not referenced. In one embodiment, prior to removing a package component, processing logic consults the knowledge database that contains information on package components that must be present in the root file system.

Figure 5:
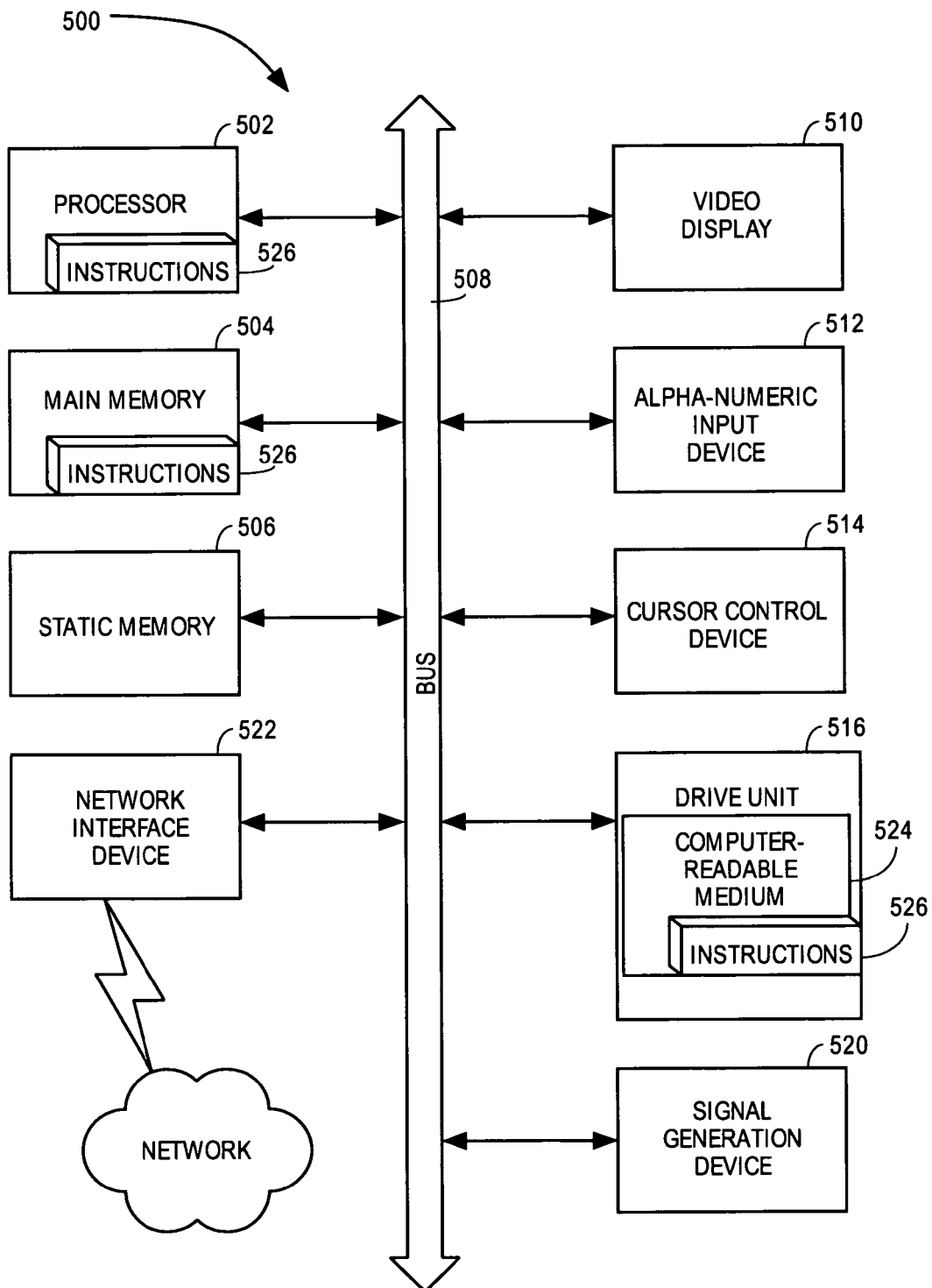
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets.

The processing device 502 is configured to execute processing logic 526 for performing the operations and steps discussed herein.

The computer system 500 may further include a network interface device 522. It also may include a video display unit 510 (e.g., a liquid crystal display (LCD) or a cathode ray tube (CRT)), an alphanumeric input device 512 (e.g., a keyboard), a cursor control device 514 (e.g., a mouse), and/or a signal generation device 520 (e.g., a speaker). Although not shown, the computer system 500 may also include a pen digitizer and/or pen or stylus. The digitizer may be apart from the video display unit 510 or co-extensive with the display area of the display unit 510. Further, the digitizer may be integrated in the display unit 510, or may exist as a separate device overlaying or otherwise appended to the display unit 510.

The computer system 500 may also include a data storage device 516 having a machine-accessible storage medium 524 on which is stored one or more sets of instructions (e.g., software 526) embodying any one or more of the methodologies or functions described herein. The software 526 may also reside, completely or at least partially, within the main memory 504 and/or within the processing device 502 during execution thereof by the computer system 500, the main memory 504 and the processing device 502 also constituting machine-accessible storage media. The software 526 may further be transmitted or received over a network 520 via the network interface device 522.

While the machine-accessible storage medium 524 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
   identifying, by a host computer system executing an embedded system development tool, one or more applications to be installed on a target embedded system of a target device;
   integrating, on the host computer system, packages of the applications into a root file system;
   prior to loading an image of the root file system into the target embedded system of the target device, estimating, by the host computer system, an amount of memory required for an operation of the embedded system based on the root file system, the estimating comprising calculating an amount of required static memory and calculating an amount of required dynamic memory;
   making a first comparison, by the host computer system, of the estimated amount of required static memory to an amount of static memory available on the embedded system;

making a second comparison of the estimated amount of required dynamic memory to an amount of dynamic memory available on the embedded system; and determining whether to load an image of the root file system onto the target device based on the first comparison and the second comparison.

2. The method of claim 1 wherein the embedded system comprises one of a set-top box, a network appliance, a handheld device, or a mobile phone.

3. The method of claim 1 wherein calculating the amount of the required static memory comprises:

determining a first storage space for the root file system;
determining a second storage space for a kernel;
determining a third storage space for boot code; and
calculating the amount of required static memory based on the first, second and third storage space.

4. The method of claim 3 wherein the kernel comprises a Linux operating system and the packages are RPM or IPKG packages.

5. The method of claim 1 wherein calculating the amount of the required dynamic memory comprises:

determining a dynamic memory space required for a kernel; and
determining a dynamic memory space required for each of the applications.

6. The method of claim 1 further comprising:

determining that the estimated amount of required memory exceeds the amount of available memory;
modifying the identified applications to be installed on the target embedded system; and
recalculating an amount of memory required for the operation of the embedded system.

7. The method of claim 6 wherein modifying the identified applications comprises:

receiving user input identifying a new set of applications.

8. The method of claim 6 wherein modifying the identified applications comprises:

automatically determining which application needs to be removed to satisfy the amount of memory available on the embedded system.

9. The method of claim 1 wherein packages are selected based on a class of the embedded system.

10. The method of claim 9 further comprising:

removing, from the root file system, package components that are not required for the operation of the embedded system.

11. The method of claim 10 wherein the package components that are not required comprise one or more of unneeded manual pages, unneeded locales, unneeded device drivers, or shared libraries that are not referenced by executable files within the root file system.

12. The method of claim 1 wherein the identifying, the estimating and the comparing are performed without user interaction.

13. A non-transitory machine-accessible medium including data that, when accessed by a machine, cause the machine to perform a method comprising:

identifying, by a host computer system executing an embedded system development tool, one or more applications to be installed on a target embedded system of a target device;
integrating, on the host computer system, packages of the applications into a root file system;
prior to loading an image of the root file system into the target embedded system of the target device, estimating, by the host computer system, an amount of memory required for an operation of the embedded system based on the root file system, the estimating comprising calculating an amount of required static memory and calculating an amount of required dynamic memory;
making a first comparison, by the host computer system, of the estimated amount of required static memory to an amount of static memory available on the embedded system;
making a second comparison of the estimated amount of required dynamic memory to an amount of dynamic memory available on the embedded system; and
determining whether to load an image of the root file system onto the target device based on the first comparison and the second comparison.

14. The machine-accessible medium of claim 13 wherein calculating the amount of the required static memory comprises:

determining a first storage space for the root file system;
determining a second storage space for a kernel;
determining a third storage space for boot code; and
calculating the amount of required static memory based on the first, second and third storage space.

15. The machine-accessible medium of claim 14 wherein the kernel comprises a Linux operating system and the packages are RPM or IPKG packages.

16. The machine-accessible medium of claim 13 wherein calculating the amount of the required dynamic memory comprises:

determining a dynamic memory space required for a kernel; and
determining a dynamic memory space required for each of the applications.

17. The machine-accessible medium of claim 13 wherein the method further comprises:

determining that the estimated amount of required memory exceeds the amount of available memory;
modifying the identified applications to be installed on the target embedded system; and
recalculating an amount of memory required for the operation of the embedded system.

18. An apparatus for a host computer system, comprising:

a user interface to facilitate user input identifying one or more applications to be installed on a target embedded system of a target device; and
a memory optimizer to:
integrate, on the host computer system, packages of the applications into a root file system,
estimate, prior to loading an image of the root file system into the target embedded system of the target device, an amount of memory required for an operation of the embedded system based on the root file system, wherein to estimate the amount of memory the memory optimizer calculates an amount of required static memory and calculates an amount of required dynamic memory,
make a first comparison of the estimated amount of required static memory to an amount of static memory available on the embedded system,
make a second comparison of the estimated amount of required dynamic memory to an amount of dynamic memory available on the embedded system, and
determine whether to load an image of the root file system onto the target device based on the first comparison and the second comparison.

19. The apparatus of claim 18 wherein the memory optimizer is to calculate the amount of the required static memory by determining a first storage space for the root file system, determining a second storage space for a kernel,
determining a third storage space for boot code, and
calculating the amount of required static memory based on the first, second and third storage space.

20. The apparatus of claim 19 wherein the kernel comprises a Linux operating system and the packages are RPM or IPKG packages.

21. The apparatus of claim 18 wherein the memory optimizer is to calculate the amount of the required dynamic memory by determining a dynamic memory space required for a kernel, and determining a dynamic memory space required for each of the applications.

22. The apparatus of claim 18 wherein the memory optimizer is further to determine that the estimated amount of required memory exceeds the amount of available memory, to modify the identified applications to be installed on the target embedded system, and to recalculate an amount of memory required for the operation of the embedded system.

23. The method of claim 1 further comprising:

when determining that the estimated amount of required memory does not exceed the amount of available memory on the target embedded system, compressing the root file system to the image, and loading the image of the root file system to the target embedded system or a simulated target device on the host computer system.

* * * * *